US012776136B2

(12) United States Patent
Hattori et al.

(10) Patent No.: US 12,776,136 B2
(45) Date of Patent: Oct. 27, 2026

(54) ENHANCING ANOMALY DETECTION PIPELINE WITH A POST-HOC GENERATIVE AI MODEL TO SUPPORT HUMAN UNDERSTANDING AND POLICY AUTOMATION

(71) Applicant: Dell Products L.P., Round Rock, TX (US)

(72) Inventors: Leandro Takeshi Hattori, Campo Grande-MS (BR); Luiz Fernando Sommaggio Coletta, Tupã-SP (BR); Victor da Cruz Ferreira, Rio de Janeiro-RJ (BR); Vinicius Facco Rodrigues, São Paulo-SP (BR)

(73) Assignee: Dell Products L.P., Round Rock, TX (US)

( * ) Notice: Subject to any disclaimer, the term of this patent is extended or adjusted under 35 U.S.C. 154(b) by 368 days.

(21) Appl. No.: 18/484,351

(22) Filed: Oct. 10, 2023

(65) Prior Publication Data

US 2025/0118066 A1 Apr. 10, 2025

(51) Int. Cl.

*G06V 10/42* (2022.01)
*G06F 40/289* (2020.01)
*G06F 40/40* (2020.01)
*G06V 10/764* (2022.01)
*G06V 10/86* (2022.01)
*G06V 10/98* (2022.01)

(52) U.S. Cl.

CPC ............ *G06V 10/86* (2022.01); *G06F 40/289* (2020.01); *G06F 40/40* (2020.01); *G06V 10/98* (2022.01)

(58) Field of Classification Search

USPC ............... 382/100–225; 714/1–57, 699–799; 706/1–62, 900–903

See application file for complete search history.

(56) References Cited

U.S. PATENT DOCUMENTS

| | | | | |
|---|---|---|---|---|
| 2019/0130669 | A1* | 5/2019 | Boggio | G05B 23/024 |
| 2024/0127587 | A1* | 4/2024 | Kim | G06V 10/454 |
| 2024/0276037 | A1* | 8/2024 | Liu | G06V 20/70 |
| 2024/0312166 | A1* | 9/2024 | Kasahara | G06T 5/60 |
| 2024/0406535 | A1* | 12/2024 | Watson | G06V 40/167 |
| 2025/0054322 | A1* | 2/2025 | Ye | G06F 40/279 |
| 2025/0094482 | A1* | 3/2025 | Najdenkoska | G06F 16/55 |
| 2025/0104394 | A1* | 3/2025 | Qiu | G06V 10/764 |

OTHER PUBLICATIONS

Dell, E. M. C. “CloudIQ Detailed Review.” White Paper, Oct. 2018.

(Continued)

*Primary Examiner* — Marcellus J Augustin
(74) *Attorney, Agent, or Firm* — Workman Nydegger

(57) ABSTRACT

One example method includes receiving an input vector that includes time series data indicative of an anomaly, generating, based on the input vector, a visual image that corresponds to the time series data, using a first vision-language model (VLM) to transform the visual image into output text that explains the anomaly, building a prompt that comprises the visual image and the explanation text, using a second VLM to generate a recommendation based on the prompt, and resolving a cause of the anomaly by implementing the recommendation.

20 Claims, 9 Drawing Sheets

(56) References Cited

OTHER PUBLICATIONS

Elhafsi et al. "Semantic Anomaly Detection with Large Language Models." arXiv preprint arXiv:2305.11307 (2023).
Rivera et al. "Automation of network anomaly detection and mitigation with the use of IBN: A deployment case on KOREN," 2022 IEEE 23rd International Symposium on a World of Wireless, Mobile and Multimedia Networks (WoWMoM), Belfast, United Kingdom, 2022, pp. 294-299, doi: 10.1109/WoWMoM54355.2022.00056.
Hugging Face—BLIP-2 Documentation. Hugging Face, [Online]. Available: https://huggingface.co/docs/transformers/main/model_doc/blip-2 (Accessed: Oct. 4, 2023).

* cited by examiner

ENHANCING ANOMALY DETECTION PIPELINE WITH A POST-HOC GENERATIVE AI MODEL TO SUPPORT HUMAN UNDERSTANDING AND POLICY AUTOMATION

FIELD OF THE INVENTION

Embodiments of the present invention generally relate to anomaly detection in time series data. More particularly, at least some embodiments of the invention relate to systems, hardware, software, computer-readable media, and methods, for the detection, and in-depth, human-readable, explanation, of anomalies in time series data.

BACKGROUND

Anomaly detection in time series is a problem present in many domains, including operations in which applications servers run several instances of internal and customer services. System administrators constantly need to recover application instances from misbehaviors that can cause service interruptions and impact customers directly. Administrators can proactively take actions to avoid service interruptions by identifying anomalies that indicate forthcoming system disruptions.

Currently, algorithms are applied to detect anomalies and outliers in time series, however, those algorithms may not be adequate to drive system administrator actions in tackling the problems that caused the anomalies. Besides the standard alert, providing reasoning for anomalies, which facilitates human understanding and actions, is essential for an augmented experience toward clarifying causes, and not only the presence of undesired behaviors. However, traditional approaches rely on simple explanation of the main metrics/features that led the system to generate an alert for a specific anomaly, which is not sufficient for administrators to derive the precise actions required to solve the issue. Thus, the following problems, at least, characterize conventional anomaly detection solutions: reasoning of anomalies are poor in details that could help humans understand their origin; and simple anomaly detection alerts are not sufficient to systematically define automatic actions to mitigate the problems behind them.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
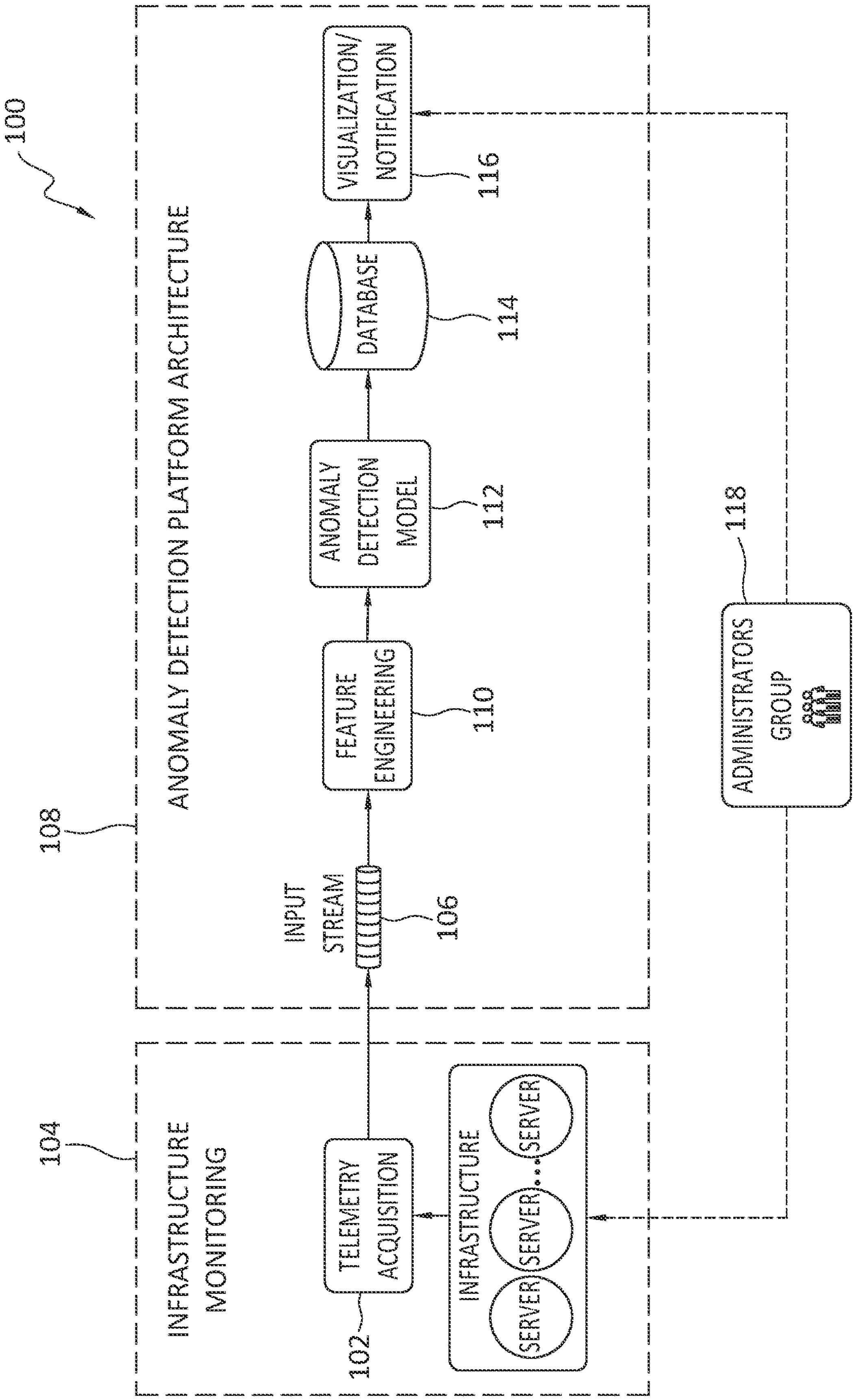
FIG. 1 discloses aspects of a comparative example of a hypothetical conventional anomaly detection pipeline.

Embodiments of the present invention generally relate to anomaly detection in time series data. More particularly, at least some embodiments of the invention relate to systems, hardware, software, computer-readable media, and methods, for the detection, and in-depth, human-readable, explanation, of anomalies in time series data.

One example embodiment comprises a method, which may be implemented by an EPAG (Explainability and Policy Automation Generator) module, that comprises the following operations: [1] a Vector to Image Processor receives an input vector to produce its corresponding visual representation—for example, a line chart may, in one embodiment, be the simplest and natural resulting image that this component can generate; [2] an Explainability Manager feeds the image into a fine-tuned VLM (visual language modeling) model that transforms the image into an anomaly explanation text; [3] the Explainability Manager forwards the VLM output text in two different directions: the storage and notification generation; [4] a Policy Manager builds a prompt combining a fixed template, the time series image, and the explanation text, and feeds it into a different fine-tuned Multi-Modal VLM model that provides a recommendation according to a multi-modal classification; and, finally, [5] the Policy Manager forwards the VLM recommendation to the storage and notification generation. The VLM recommendation may be acted upon by a human and/or computing system to resolve the detected anomaly.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s).

Finally, it is not required that any embodiment implement any of the advantageous and unexpected effects disclosed herein.

In particular, one advantageous aspect of an embodiment of the invention is that human-readable explanations may be generated automatically for anomalies detected in data, such as time-series data for example. An embodiment may enable faster and more accurate, relative to conventional approaches, explanation, and resolution, of detected anomalies. Various other advantages of one or more embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for an Example Embodiment

The following is a discussion of the context for an example embodiment. This discussion is not intended to limit the scope of the invention, or the applicability of the embodiments, in any way.

A.1 Context Overview

Currently, there are some approaches that focus on enhancing the anomaly detection pipeline. However, such approaches typically address reasoning, and policy automation, separately. For example, Dell CloudIQ offers an anomaly detection approach to identify abnormal behavior in IT infrastructures. Another example approach involves use of a real-time processing architecture for anomaly detection in networking systems—however, this approach is implemented simply as an anomaly detector, and not as an explainability framework, as in the case of an example embodiment. Finally, another conventional approach focuses on network infrastructure anomaly detection with human-designed policy actions while, in contrast, one embodiment performs anomaly explainability and learn its relationship with the policies, providing flexibility and semantic-based anomaly handling. Human-designed policy automation may have biases and limitations, while one example embodiment may avoid these issues by leveraging learning capabilities. Thus, an example embodiment may provide a post hoc generative AI (artificial intelligence) solution to enhance a basic anomaly detection pipeline. This example embodiment addresses the limitations of the basic anomaly detection pipeline, and introduces various aspects to improve the overall effectiveness and reasoning of anomaly detections.

A.2 Detailed Context Discussion

In this section, an overview is provided of various subjects discussed later herein. In the overview, the first section introduces how a standard anomaly detection pipeline is implemented today, and illustrates how aspects of an example embodiment may be implemented in that space. The next section provides details on LLMs focusing on multimodal models. Section A.2.3 presents LLM (large language model) fine-tuning concepts with a focus on Prompt-Learning, as may be implemented in one example embodiment.

A.2.1 Anomaly Detection Pipeline

With attention now to FIG. 1, there is disclosed a hypothetical basic anomaly detection pipeline 100, in connection with which an example embodiment may be implemented. Initially, the pipeline 100 may gather data that a user would like to check for anomalies. The data may be collected using a telemetry acquisition service 102 of an infrastructure monitoring system 104, and later forwarded into an input stream 106 that may be fed to, or form a part of, an anomaly detection platform architecture 108. An offline procedure may be performed beforehand to select the best data features and to identify which preprocessing steps should be applied to improve the anomaly detection algorithm accuracy. During the online pre-processing stage, a feature engineering module 110 may filter the data from the input stream 106 and apply, to the data, all such pre-established preprocessing operations. An anomaly detection module may then receive the preprocessed data and then process that data using an anomaly detection model 112. Anomaly detection approaches may vary from statistical analysis up to more complex ML (Machine Learning)-based models. Any results of the anomaly detection process may then be logged into a database 114. In case an anomaly is detected, an alert 116 may be generated for an administrator who can take the necessary actions to resolve the anomaly.

In an embodiment, the anomaly detection pipeline 100 may be modified by introducing a module, downstream of the anomaly detection model 112, which enables a model independent post-hoc LM-based anomaly explainability coupled with a policy automation to decrease human dependability. Further details concerning this example implementation are provided elsewhere herein.

A.2.2 Multimodal LLM (Large Language Model)

Multimodal LLMs may operate to process multiple modalities of data, such as image, and text, among others. Typical approaches rely on an encoder pipeline that will transform each modality into a meaningful embedding for the LLM. For example, BLIP-2 (Bootstrapping Language-Image Pre-training with Frozen Image Encoders and Large Language Models) is one approach that leverages a similar procedure with a frozen visual encoder and textual prompt to understand the semantics in VQA (visual question answering) and IC (image captioning).

A.2.3 Prompt-Learning

A recent paradigm concerns NLP (Natural Language Processing) problems based on LLMs that model the probability of text directly by selecting the appropriate prompt. The algorithm can manipulate the model behavior so that the pre-trained LLM itself can be used to predict the desired output, without any additional task-specific training. This results in more computationally efficient processes while maintaining the improvements in the downstream task.

An example embodiment may employ continuous prompts (soft) which are not limited to human-interpretable natural language. The prompting may be performed directly in the model embedding space of the model, instead of using textual prompt engineering. These embedding parameters may be tuned based on training data for the downstream task.

B. Overview of Aspects of an Example Embodiment

B.1 General Considerations

In view of problems and considerations such as those discussed above, an example embodiment comprises an approach that improves reasoning of detected anomalies by employing LMs (language models), one particular example of which is an LLM. Architecturally, this approach may comprise both a generic anomaly detection pipeline, such as is disclosed in FIG. 1, and an additional module, namely, an EPAG (explainability and policy automation generator) module, introduced into that generic anomaly detection pipeline. Thus, example embodiments may include, but are not limited to, both an anomaly detection pipeline, as well as the EPAG module, details of which are set forth below.

In an embodiment, the EPAG module is placed immediately downstream from the anomaly detection phase, such as the anomaly detection model 112 of FIG. 1, and the EPAG module is responsible for generating human-readable text and action classifications employing LMs. The former aims at helping administrators to understand the reasons behind the alert generated by the anomaly detection algorithm, while the latter aims at providing the direct action to solve the detected problem. Therefore, besides providing the reasoning for anomalies, the EPAG module also provides classifications that can be used to automate actions.

B.2 Embodiment Overview

A generic anomaly detection pipeline, such as the example of FIG. 1, may comprise four phases: (1) data acquisition/ingestion (input); (2) feature engineering; (3) anomaly detection; and (4) storage and notification generation (output). An anomaly detection pipeline according to one example embodiment may additionally comprise an EPAG module, positioned between phases 3 and 4 so as to transform a conventional anomaly detection module output into two outputs: [1] a human readable text explaining the anomaly; and [2] a classification label defining the action required to address the anomaly.

The anomaly detection module of phase 3 may be responsible for processing input vectors resulting from windowed time series data. In case an anomaly is detected, the anomaly detection module may forward a vector to the EPAG module. In an embodiment, the EPAG module leverages VLM (Visual Language Modeling) functionality and may comprise three components: [1] a Vector to Image Processor; [2] an Explainability Manager; and [3] a Policy Manager. Following is a brief description of some operational aspects of an EPAG module according to one example embodiment.

In an embodiment, an EPAG module may operate as follows:

1. a Vector to Image Processor of the EPAG module receives the input vector to produce its corresponding visual representation—in one example embodiment, a line chart may be the simplest and natural resulting image that this component can generate;
2. an Explainability Manager of the EPAG module then feeds the image into a fine-tuned VLM model that transforms the image into an anomaly explanation text;
3. then, the Explainability Manager forwards the VLM output text in two different directions, namely, to the storage and notification generation (previous phase 4—reference 116 in FIG. 1), and to a Policy Manager of the EPAG module;
4. the Policy Manager builds a prompt combining a fixed template, the time series image, and the explanation text, and feeds it into a different fine-tuned Multi-Modal VLM model of the EPAG module that then provides a recommendation according to a multi-modal classification; and
5. finally, the Policy Manager forwards the VLM recommendation to the storage and notification generation (previous phase 4).

In an embodiment, the addition of the EPAG module thus changes the generic pipeline output from simple data vectors with annotated anomalies, to human readable text and action insights. The former helps administrators to understand the anomaly while the latter may enable automation of actions according to the undesired behavior found. Following is a brief overview of two manager components inside an embodiment of an EPAG module.

B.2.1 Explainability Manager

In an embodiment, the explainability manager receives, as input, an image representing a time series window as a line chart, and in response to this input, the explainability manager outputs a corresponding text explaining the existing anomalies. To perform this task, the explainability manager may use a VLM model that was previously fine-tuned to generate text from an input image. The fine-tuning process may be performed offline and may leverage expert-annotated data to force the VLM model to generate cohesive and coherent answers. Intuitively, the VLM model may replicate the behavior of experts who can explain anomalies by inspecting them in an image plot. One example embodiment employs prompt-learning due to its relatively smaller computation complexity. The generated output text may then be forwarded to the storage and notification generation. Additionally, the explainability manager may also forward the text to the policy manager of the EPAG module.

B.2.2 Policy Manager

In an embodiment, the policy manager of an EPAG module receives, as input, the time series image and the output explainability text previously generated by the explainability manager. As output, the policy manager generates an action label produced by a VLM model, that was previously fine-tuned in a prompt-learning approach to specifically perform policy classification. The policy manager may leverage a multi-modal head that creates a jointed embedding of the explainability text and the anomaly plot image.

The policy inferred by the VLM model may then be forwarded by the policy manager to the storage and notification generation, thus ending the pipeline flow. It is noted that this classification output may comprise a label to a pre-defined action, or actions, the system may take to mitigate the anomaly, so helping to remove the manual analysis requirement, which thus enables more automated and fast actions.

Because an example embodiment may leverage prompt-learning in both the explainability manager and the policy manager, those managers may share the same pre-trained LM model, whose parameters may remain frozen. This approach may enable space savings, as most of the weights can be reused, resulting in efficient resource utilization. Also, prompt-learning works well for scenarios where the data labels may be scarce.

B.2.3 Example Aspects of an Embodiment

As exemplified in the foregoing discussion, and elsewhere herein, an embodiment may possess various useful features and aspects, although no embodiment is required to comprise any of such features and aspects. Following is a brief discussion of a few illustrative examples.

An example embodiment operates to improve alerts from anomaly detection algorithms by generating human interpretable text. Additionally, an embodiment may enable the implementation of automated actions required to mitigate the detected problems. In more detail, an example embodiment may use anomaly reasoning to help explain misbehaviors through a human-readable, and/or auditory, text produced by a fine-tuned VLM. Particularly, an EPAG module may generate anomaly reasoning, based on images, by employing a fine-tuned LLM model to improve human readability.

Further, an example embodiment may implement policy classification via Multi-Modal VLM to eliminate manual post-hoc analysis and, instead, to enable automatic actions to be taken to rapidly mitigate the problem or anomaly. Particularly, an EPAG module may employ a fine-tuned LLM model to generate policy classifications for action automation in the infrastructure.

C. Detailed Discussion of an Example Embodiment

An example embodiment provides a post-hoc explainability and policy automation module to enhance the anomaly detection pipeline. As noted, a module for implementing this functionality is referred to herein as an EPAG module.

In an embodiment, explainability is an aspect that enhances the reliability of the entire framework by helping the administrators understand the anomaly alerts and the reasoning behind the detection, that is, the reason that an event or occurrence was flagged as anomalous. On the other hand, policy automation speeds up the framework by decreasing the dependability of human intervention. These two factors are often overlooked when developing an end-to-end anomaly detection solution. An embodiment addresses these two fronts with a coupled solution that is generic and can be easily incorporated into existing anomaly detection pipelines.

Advantageously then, an embodiment may couple the generated explanation with the policy automation, both leveraged by the capacity of a generative AI system. Specifically, an embodiment comprises an LM methodology to force an ML model into similar reasoning as that of an anomaly detection expert. This approach may create better quality human-interpretable explanations, and better guide the suggested policy actions.

Figure 2:
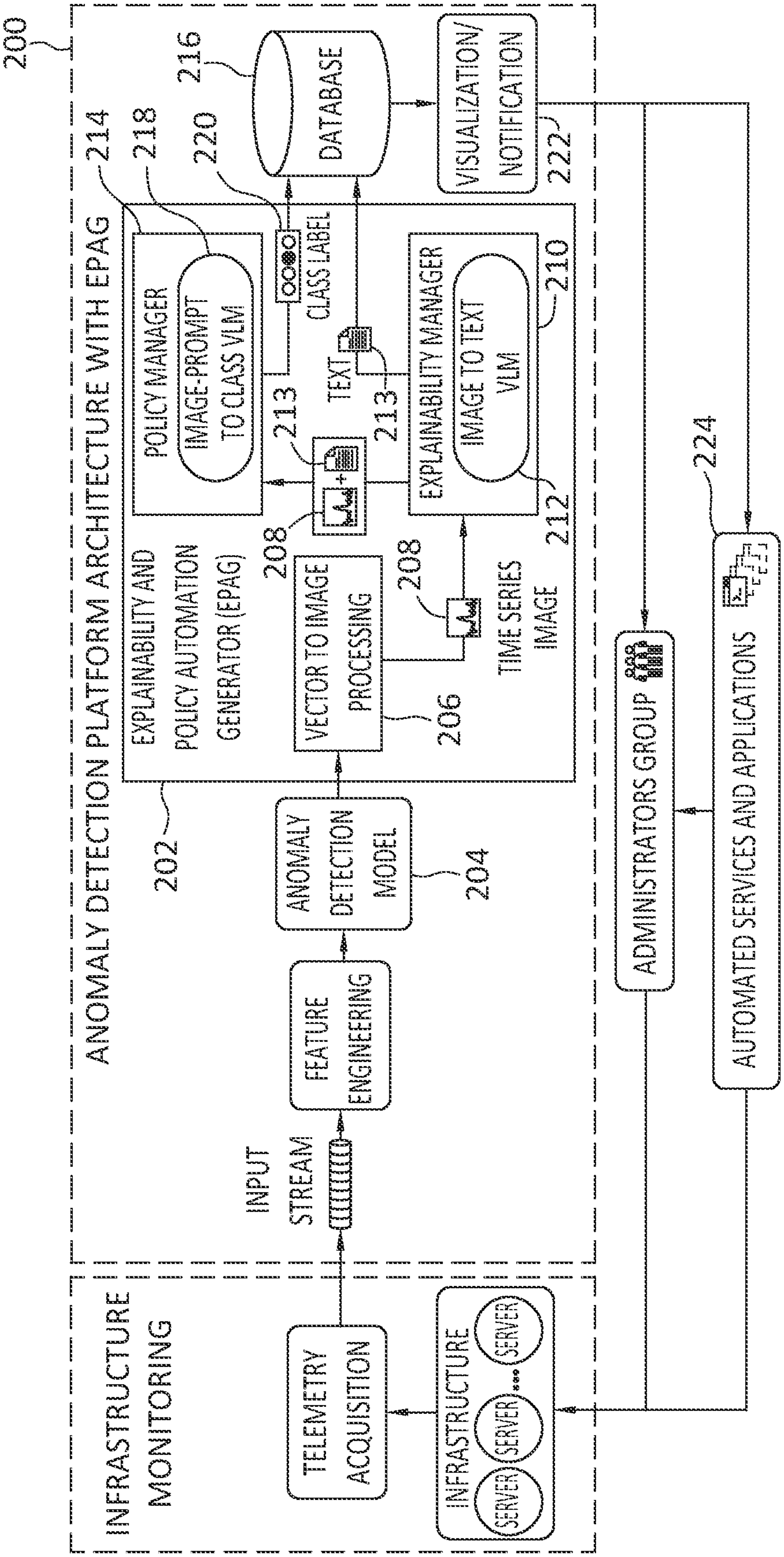
FIG. 2 discloses aspects of the hypothetical conventional anomaly detection pipeline of FIG. 1, as modified to include an EPAG and its main components.
Figure 3:
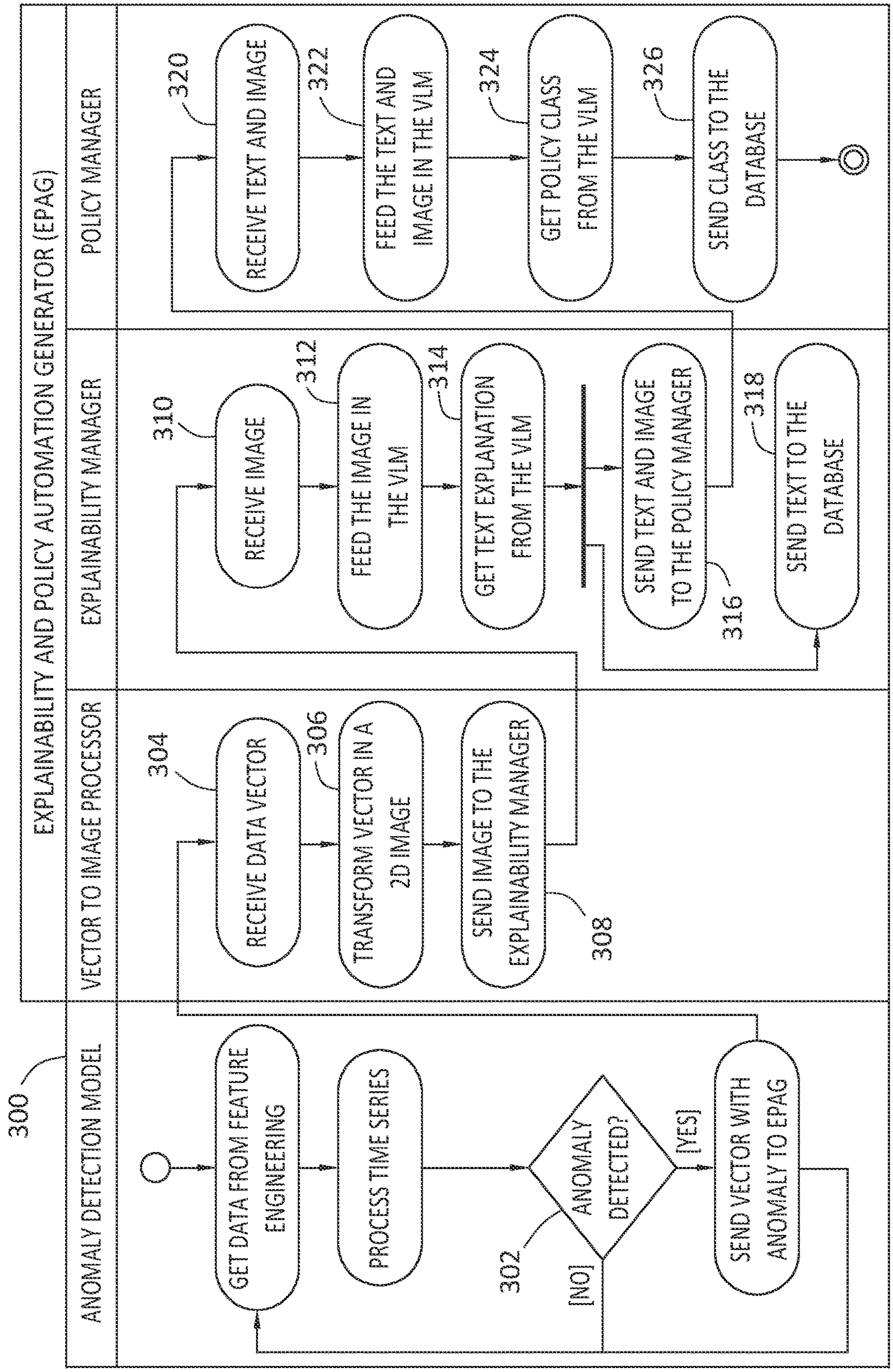
FIG. 3 discloses an EPAG activity diagram, according to one embodiment.

With reference now to FIG. 2, an example anomaly detection pipeline 200 is disclosed that comprises, among other things, an EPAG module 202 with various components and functionalities. Except with respect to the EPAG module 202, and its operations, the example anomaly detection pipeline 200 may be similar, or identical, to the anomaly detection pipeline disclosed in FIG. 1. As well, FIG. 3 discloses an activity diagram 300 that shows various tasks performed by the EPAG module. FIGS. 2 and 3 are referred to together in the following discussion.

In an embodiment, the EPAG module 202 may be initialized only after an anomaly is detected 302 by the anomaly detection model 204. The EPAG module 202 receives 304 an input time series vector from the anomaly detection model 204, and a vector to image processor 206 of the EPAG module 200 preprocesses 306 the time series vector into a plot image 208, which is then transmitted 308 to an explainability manager 210 for processing.

The explainability manager 210 may receive 310 the plot image 208 from the vector to image processor 206, and feed the plot image 208 to a VLM (vision-language model) 212 which may then generate 314 anomaly text explanations 213 from the image. The plot image 208 and text explanations 213 may then be forwarded 316 to a policy manager 214, and the text explanations may also be forwarded 318 to a database 216.

The policy manager 214 may receive 320 the plot image 208 and anomaly text explanations 213, and feed 322 the plot image 208 and anomaly text explanations 213 to a multimodal VLM 218 for classification. The multimodal VLM 218, which may have the same LM core, such as a neural network for example, as the VLM 212, may then process 324 the plot image 208 and the anomaly text explanations 213 into a pre-defined action label, or class label 220. The class label 220 may then be forwarded 326 to the database 216, and a notification 222 sent to an automated visualization/notification service 224 that has the knowledge and power to execute the corresponding remedial action for the detected anomaly. These various EPAG functionalities are discussed in further detail below.

C.1 Vector to Image Processor

Figure 4:
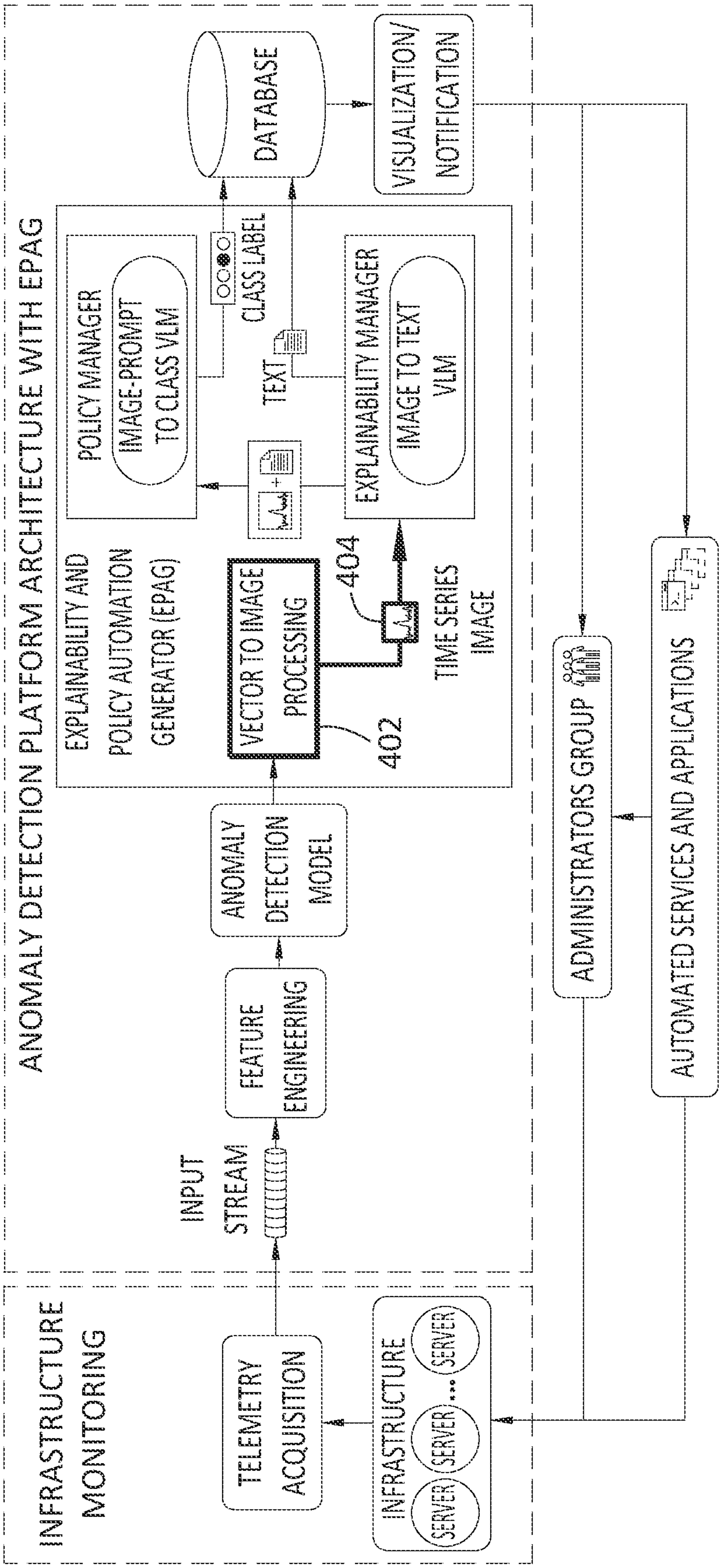
FIG. 4 discloses aspects of a vector to image processor, according to one embodiment.

In the first part of the EPAG pipeline (the "Vector to Image Processor" in FIG. 3), and with reference now to FIG. 4 as well, a vector to image processor 402 is responsible for converting the input vector into a corresponding visual representation 404, such as a time series image for example Error! Reference source not found. . . This process thus interprets the data contained within the input vector and generates a suitable visual representation that effectively conveys both the time series and anomaly information.

The vector to image processor 402 need not take any particular form, so long as it is able to produce a human readable plot, where an expert may point out within the current window, where and what the anomaly is. This may include normalization and scaling of the input data, as well as the application of color schemes, axis labels, and other graphical elements, to enhance the readability and interpretability of the resulting plot image. The resulting plot image 208 is then provided as input to the explainability manager 210 and the policy manager 214.

C.2 Explainability and Policy Actions Classification With Language Modeling

Figure 5:
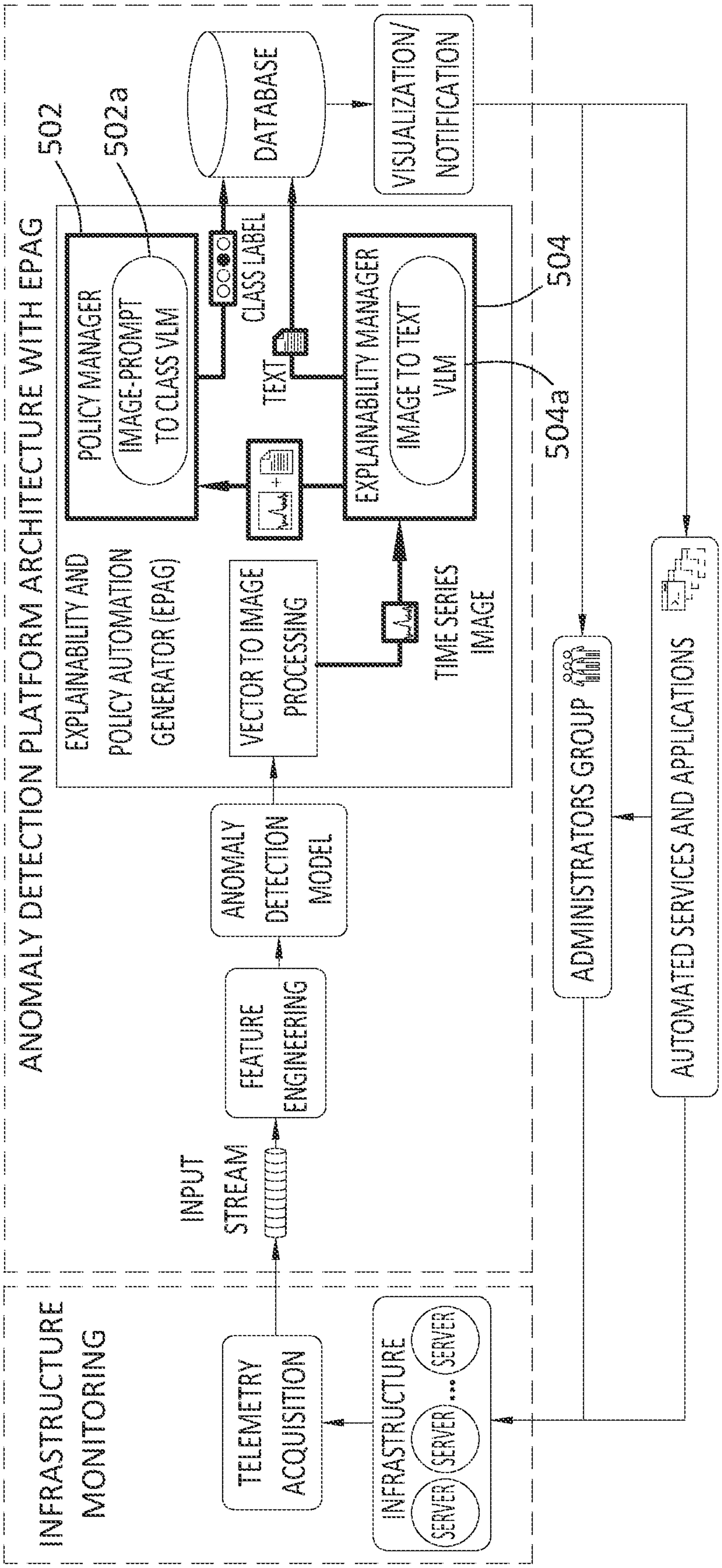
FIG. 5 discloses aspects of explainability and policy managers with their respective strategies and outputs, according to an embodiment.

This section discusses the explainability manager 210 (502 in FIG. 5) and the policy manager 214 (504 in FIG. 5) components of the EPAG 202. As shown in FIG. 5, the explainability manager 502 and the policy manager 504 may each comprise a respective neural network (NN) pipeline, namely, VLM **502*a* and VLM 504*a*, with different respective inputs and outputs (see FIG. 2** and discussion).

In an embodiment, the VLMs **502*a* and 504*a* may each comprise a core pre-trained LM with a tunable soft prompt that is fine-tuned to perform different tasks, that is, causal language modeling (explainability) and classification (policy automation). Because of the total number of parameters an LLM may employ, sharing a pre-trained network may enable an embodiment to save space as most of the weights from one of the VLMs 502*a*/504*a* can be reused by the other VLM 502*a*/504*a*, resulting in efficient resource utilization. In an embodiment, the tunable soft prompt in both networks leverage different fine-tuning procedures based on PL (Prompt-Learning), which may enable an embodiment to avoid the need to fully retrain an LM, such as the VLMs 502*a*/504*a***, resulting in faster offline training times and lower resource requirements, than would otherwise be the case.

C.2.1 Explainability Manager

In an embodiment, the explainability manager receives the visual representation generated by the vector to image processor and calls a VLM which generates an anomaly explanation. An embodiment may assume a prompt-learning fine-tuning procedure performed offline with auxiliary labels. This procedure generates a soft prompt that may be used during inferencing. An embodiment may employ a pre-trained LM that is shared with the policy manager.

Data labeling may, in an embodiment, be provided by expert administrators to provide anomaly explanation for a few image samples. From these samples, the network may learn how to describe anomalies with technical language similar to the way in which the human administrator would be expected to describe these anomalies. This offline training procedure may rely on the network to mimic human behavior by looking at image samples instead of pure text. Moreover, because an embodiment is based on soft prompt-learning, an embodiment may leverage few-shot learning, decreasing the burden of requiring a large amount of labeled data, which can be difficult to acquire.

Figure 6:
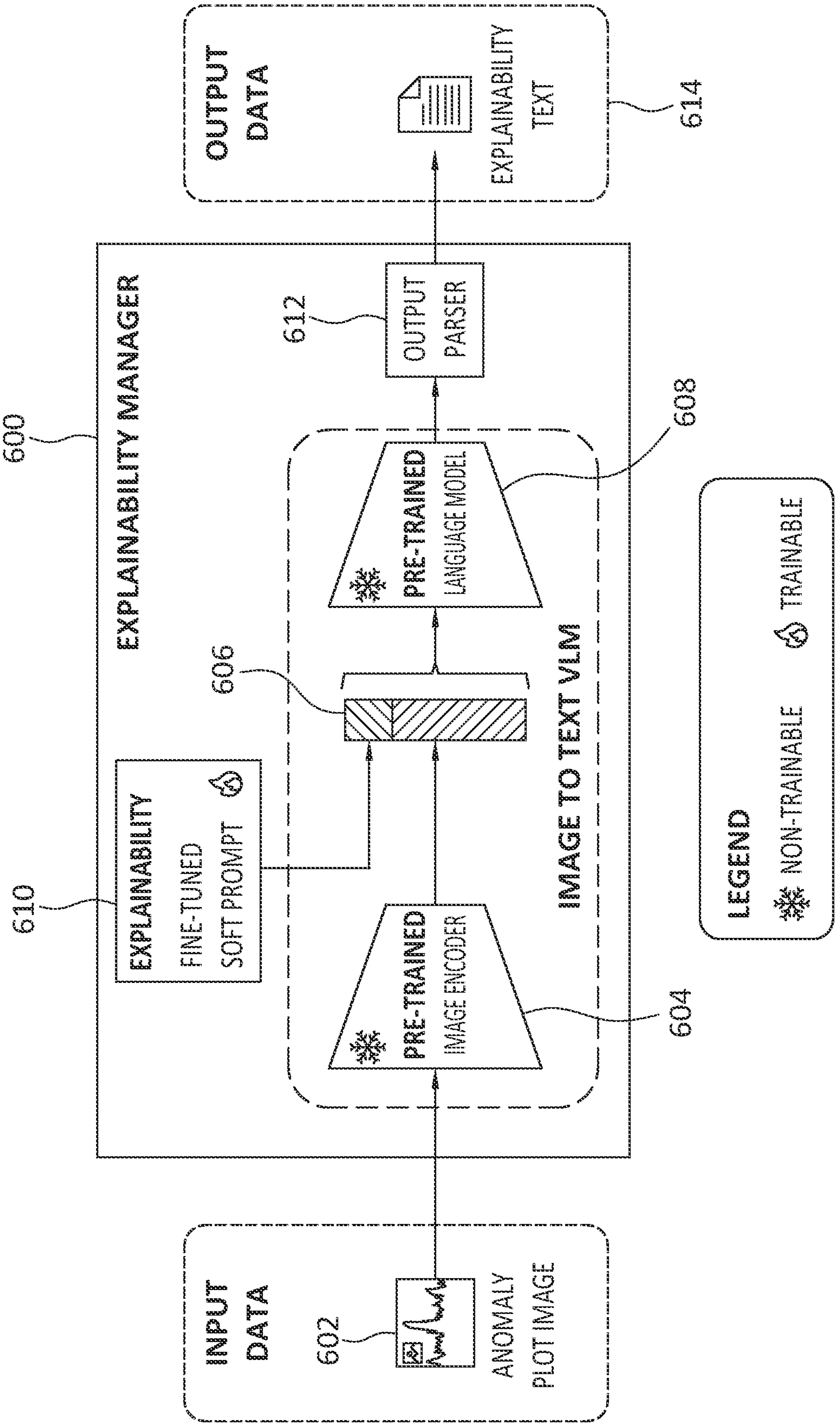
FIG. 6 discloses aspects of an explainability manager language model pipeline, according to one embodiment.

With reference now to FIG. 6, an example explainability manager language model pipeline 600 is disclosed. In FIG. 6, an anomaly plot image 602 goes through a pre-trained image encoder 604 which will generate an embedded representation of the image. The layer 606 is pre-trained and optimized for transforming the image into an embedding vector for the pre-trained language model 608, such as a VLM. The generated embedding is concatenated to the explainability fine-tuned soft prompt 610, discussed earlier herein, and fed into the pre-trained language model 608, which generates the anomaly explanation text. The soft prompt may be optimized for guiding the network to solve the explainability task, avoiding total retraining of the LM. Finally, an output parser 612 translates the VLM output to a common format, such as JSON (JavaScript Object Notation) for example. The output text 614 may be saved into a database if any future inspection is required and forwarded into the policy manager.

C.2.2 Policy Manager

In an embodiment, a policy manager receives the anomaly explainability text from the explainability manager alongside the anomaly plot image. An embodiment may leverage both inputs to produce a policy action label. The multimodality present in this module introduces additional textual information that is not present for the explainability manager. An embodiment may expect the network to take hints from both modalities and provide a more solid policy action.

Similarly to the case of the Explainability Manager, an embodiment may leverage Prompt-Learning to create a soft prompt that guides the LM into the policy classification task. During the offline fine-tuning procedure, an embodiment may employ a pre-defined set of labels for all available automated actions the system can take. With attention now to FIG. 7, further details are provided concerning an example policy manager network 700 and associated operations.

Figure 7:
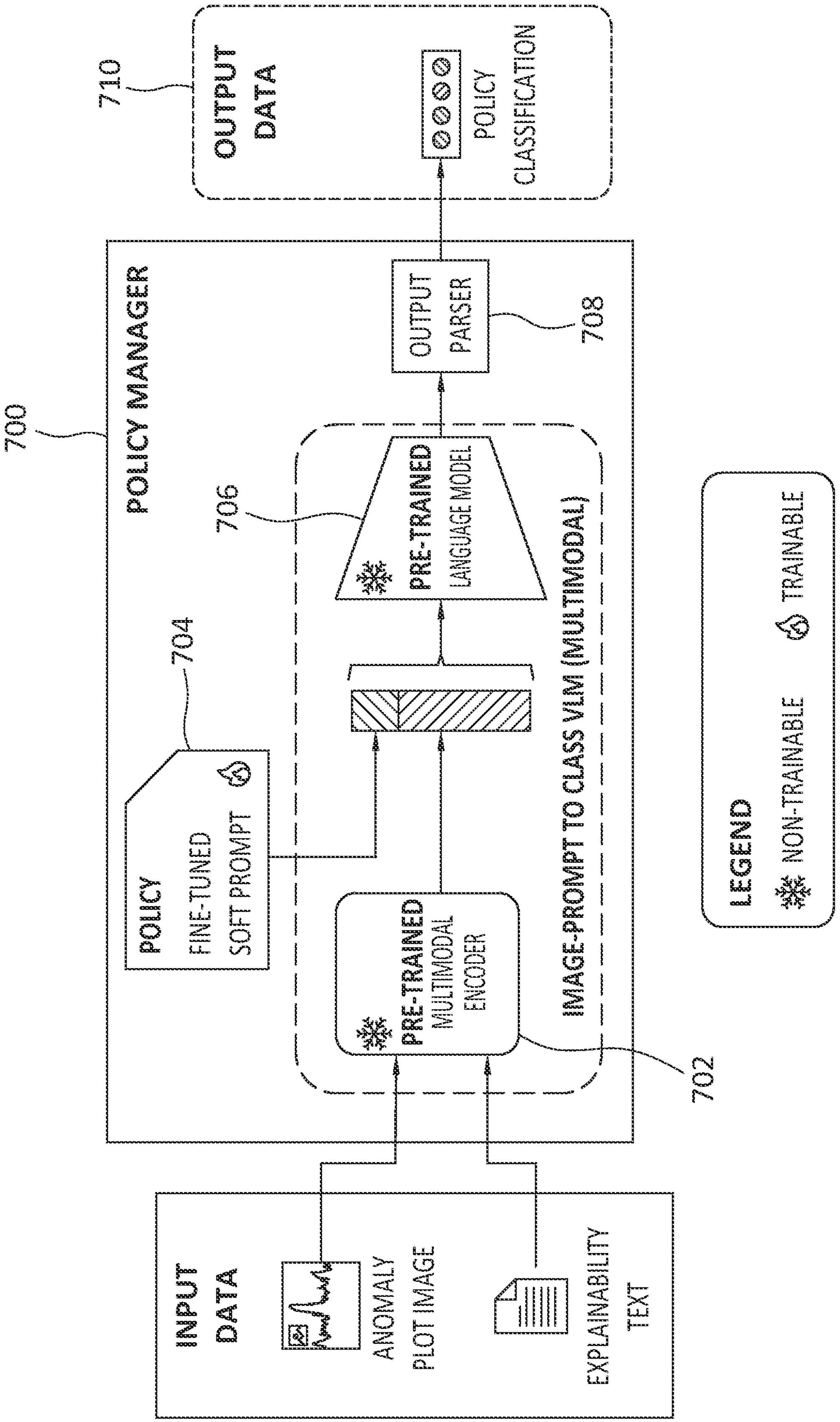
FIG. 7 discloses aspects of a policy manager network and flow, according to one embodiment.

In particular, FIG. 7 discloses a policy manager flow with respect to the VLM and its components. The image and text go through a pre-trained multi-modal encoder 702 which produces a jointed representation of the anomaly plot and explanation text palatable for the LM. The policy fine-tuned soft prompt 704 is concatenated with the multi-modal representation and forwarded into the pre-trained LM 706. The output from the LM 706 goes into an output parser 708 that generates the classification label 710 in a common format. The output parser 708 may take the form of a fully connected layer with a softmax output that translates the latent representation output of the LM into the pre-defined set of action labels. Finally, the label is forwarded into an automated service that has the knowledge and power to execute the corresponding action, thus relieving this process of human dependency.

D. Example Methods

Figure 8:
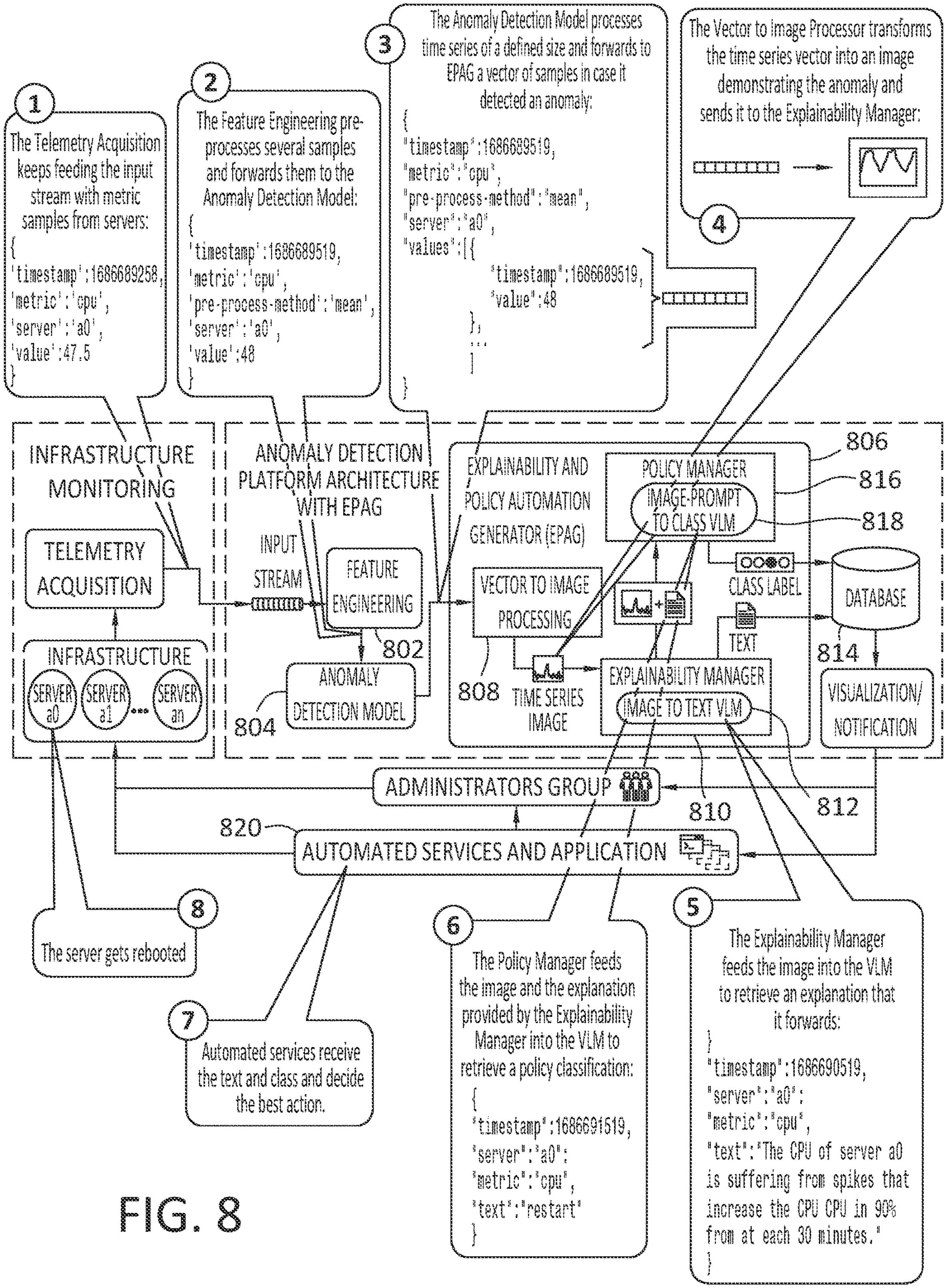
FIG. 8 discloses aspects of an overall workflow, according to one embodiment.

It is noted with respect to the disclosed methods, including the example method of FIG. 8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, an example method according to one embodiment is disclosed. In general, FIG. 8 discloses various events that occur, in one embodiment, in the entire workflow with the addition of EPAG. In each box, there is indicated an example of data that is being transmitted/processed in the workflow. The example considers a particular server “a0” is suffering from high CPU peaks at a constant interval due to an application issue.

At (1), the telemetry acquisition constantly posts a JSON document with a CPU measurement for a particular server in each time. Next, (2) a feature engineering module 802 pre-processes the CPU (central processing unit) samples, aggregating them and sending the computed CPU value as a JSON document to an anomaly detection model 804. The anomaly detection model 804 processes series of CPU samples to detect anomalies and sends (3) a JSON containing all samples from a defined time window to an EPAG 806 when an anomaly is detected.

In particular, a vector to image processor 808 of the EPAG 806 transforms the vector samples into a 2D line chart image showing the CPU peaks and sends (4) it to an explainability manager 810. The explainability manager inputs (5) the 2D image into a VLM 812 and retrieves a text explanation that is forwarded to the database 814 and a policy manager 816.

The policy manager 816 inputs (6) both 2D image and the text explanation into the VLM 818 to retrieve a classification, stating that the server needs to be rebooted, and sends that classification to the database 814. The automated services 820 receive (7) the text explanation and classification and decide to reboot the server. In an embodiment, this phase might be autonomous using the classification, that is, the automated services 820 may, on their own initiative, decide to reboot the server. Finally, the server gets rebooted (8), and the issue is solved before it can escalate any further.

E. Further Example Embodiments

Following are some further example embodiments of the invention. These are presented only by way of example and are not intended to limit the scope of the invention in any way.

Embodiment 1. A method, comprising: receiving an input vector that comprises time series data indicative of an anomaly; generating, based on the input vector, a visual image that corresponds to the time series data; using a first vision-language model (VLM) to transform the visual image into output text that explains the anomaly; building a prompt that comprises the visual image and the output text; using a second VLM to generate a recommendation based on the prompt; and resolving a cause of the anomaly by implementing the recommendation.

Embodiment 2. The method as recited in any preceding embodiment, wherein the time series data is received from an anomaly detection model.

Embodiment 3. The method as recited in any preceding embodiment, wherein the generating is performed by a vector-to-image processor.

Embodiment 4. The method as recited in any preceding embodiment, wherein the output text is readable by a human.

Embodiment 5. The method as recited in any preceding embodiment, wherein the first VLM comprises a language model (LM) core with a tunable soft prompt that is tuned to generate an explanation for the anomaly.

Embodiment 6. The method as recited in any preceding embodiment, wherein the second VLM comprises a language model (LM) core with a tunable soft prompt that is tuned to generate a policy classification.

Embodiment 7. The method as recited in any preceding embodiment, wherein the recommendation comprises an explanation as to a cause for the anomaly, and/or the recommendation comprises an action label on how to mitigate the anomaly.

Embodiment 8. The method as recited in any preceding embodiment, wherein the recommendation is implemented automatically without human intervention.

Embodiment 9. The method as recited in any preceding embodiment, wherein the anomaly concerns operation of a computing system.

Embodiment 10. The method as recited in any preceding embodiment, wherein the visual image illustrates the anomaly.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
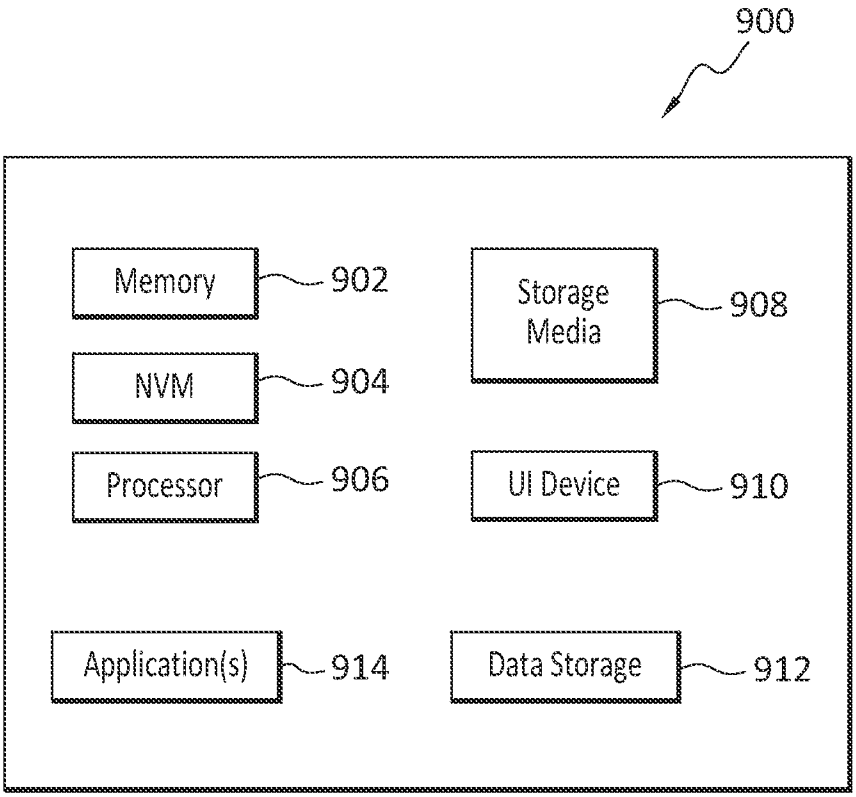
FIG. 9 discloses an example computing entity operable to perform any of the disclosed methods, processes, and operations.

With reference briefly now to FIG. 9, any one or more of the entities disclosed, or implied, by FIGS. 1-8, and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving an input vector that comprises time series data indicative of an anomaly;

generating, based on the input vector, a visual image that corresponds to the time series data;

using a first vision-language model (VLM) configured to generate human-readable explanatory text describing a cause or characteristic of the anomaly to transform the visual image into output text that explains the anomaly;

building a prompt that comprises the visual image and the output text generated by the first VLM;

using a second VLM that is different from the first VLM to generate a recommendation based on the prompt; and resolving a cause of the anomaly by implementing the recommendation.

2. The method as recited in claim 1, wherein the time series data is received from an anomaly detection model.

3. The method as recited in claim 1, wherein the generating is performed by a vector-to-image processor.

4. The method as recited in claim 1, wherein the output text is readable by a human.

5. The method as recited in claim 1, wherein the first VLM comprises a language model (LM) core with a tunable soft prompt that is tuned to generate an explanation for the anomaly.

6. The method as recited in claim 1, wherein the second VLM comprises a language model (LM) core with a tunable soft prompt that is tuned to generate a policy classification.

7. The method as recited in claim 1, wherein the recommendation comprises an explanation as to a cause for the anomaly, and/or the recommendation comprises an action label on how to mitigate the anomaly.

8. The method as recited in claim 1, wherein the recommendation is implemented automatically without human intervention.

9. The method as recited in claim 1, wherein the anomaly concerns operation of a computing system.

10. The method as recited in claim 1, wherein the visual image illustrates the anomaly.

11. A non-transitory storage medium having stored therein instructions that are executable by one or more hardware processors to perform operations comprising:

receiving an input vector that comprises time series data indicative of an anomaly;

generating, based on the input vector, a visual image that corresponds to the time series data;

using a first vision-language model (VLM) configured to generate human-readable explanatory text describing a cause or characteristic of the anomaly to transform the visual image into output text that explains the anomaly;

building a prompt that comprises the visual image and the output text generated by the first VLM;

using a second VLM that is different from the first VLM to generate a recommendation based on the prompt; and resolving a cause of the anomaly by implementing the recommendation.

12. The non-transitory storage medium as recited in claim 11, wherein the time series data is received from an anomaly detection model.

13. The non-transitory storage medium as recited in claim 11, wherein the generating is performed by a vector-to-image processor.

14. The non-transitory storage medium as recited in claim 11, wherein the output text is readable by a human.

15. The non-transitory storage medium as recited in claim 11, wherein the first VLM comprises a language model (LM) core with a tunable soft prompt that is tuned to generate an explanation for the anomaly.

16. The non-transitory storage medium as recited in claim 11, wherein the second VLM comprises a language model (LM) core with a tunable soft prompt that is tuned to generate a policy classification.

17. The non-transitory storage medium as recited in claim 11, wherein the recommendation comprises an explanation as to a cause for the anomaly, and/or the recommendation comprises an action label on how to mitigate the anomaly.

18. The non-transitory storage medium as recited in claim 11, wherein the recommendation is implemented automatically without human intervention.

19. The non-transitory storage medium as recited in claim 11, wherein the anomaly concerns operation of a computing system.

20. The non-transitory storage medium as recited in claim 11, wherein the visual image illustrates the anomaly.

* * * * *